US011629744B2

(12) United States Patent
Lin

(10) Patent No.: US 11,629,744 B2
(45) Date of Patent: Apr. 18, 2023

(54) FASTENER

(71) Applicant: Ying-Mo Lin, Nantou County (TW)

(72) Inventor: Ying-Mo Lin, Nantou County (TW)

( * ) Notice: Subject to any disclaimer, the term of this patent is extended or adjusted under 35 U.S.C. 154(b) by 306 days.

(21) Appl. No.: 17/030,791

(22) Filed: Sep. 24, 2020

(65) Prior Publication Data

US 2021/0148394 A1 May 20, 2021

(30) Foreign Application Priority Data

Nov. 19, 2019 (TW) ................................ 108142016

(51) Int. Cl.
*F16B 23/00* (2006.01)

(52) U.S. Cl.
CPC ................................ *F16B 23/0038* (2013.01)

(58) Field of Classification Search
CPC .............. F16B 23/0038; F16B 23/0007; F16B 23/0023
USPC .................................................. 411/403, 404
See application file for complete search history.

(56) References Cited

U.S. PATENT DOCUMENTS 2,397,216 A * 3/1946 Stellin ................. F16B 23/0038 411/404
3,122,963 A * 3/1964 Borgeson .............. B25B 15/005 81/436
3,575,080 A * 4/1971 Hannay ............... F16B 23/0007 411/404
4,459,074 A * 7/1984 Capuano ............ F16B 23/0007 81/461
5,020,954 A * 6/1991 Dreger ................ F16B 23/0023 411/404
5,674,037 A * 10/1997 Lu ....................... F16B 23/0092 411/404
6,453,781 B1 * 9/2002 Casino Lorite ....... B25B 15/005 411/404
6,843,729 B2 * 1/2005 Hughes ................. B25B 15/005 470/8
2011/0048181 A1 * 3/2011 Tsai ...................... F16B 23/003 81/460

FOREIGN PATENT DOCUMENTS

TW M411315 U 9/2011
TW M425188 U 3/2012

* cited by examiner

*Primary Examiner* — Flemming Saether

(74) *Attorney, Agent, or Firm* — Muncy, Geissler, Olds & Lowe, P.C.

(57) ABSTRACT

A fastener is provided, including: a driven end including an engaging hole which includes three slots recessed radially and angularly arranged in intervals, each of the three slots being formed as a part of a rectangle and including two right angles, every adjacent two of the three slots defining a rib therebetween.

9 Claims, 5 Drawing Sheets

FASTENER

BACKGROUND OF THE INVENTION

Field of the Invention

The present invention relates to a fastener.

Description of the Prior Art

A conventional fastener having a polygonal engaging hole, such as fastener in TWM425188 or TWM411315, has grooves formed on part or all of the engaging side faces of the engagement hole, to prevent slipping engagement of a wrench relative to the fastener and to avoid damage to the corners of the engagement hole of the fastener. That can result in failure of tightening or disassembly the fastener.

However, the groove of the conventional fastener having the polygonal engaging hole make the engaging side faces of the engagement hole have obtuse angles or/and acute angles so that the torsion force cannot be sufficiently transmitted to the fastener and so that it can causes weak structures near the edges of the grooves, and thus the structure of the conventional fastener is weak and is easy to be damaged.

The present invention is, therefore, arisen to obviate or at least mitigate the above-mentioned disadvantages.

SUMMARY OF THE INVENTION

The main object of the present invention is to provide a fastener which is good in structural strength and torque transmission, and is uneasy to cause slipping disengagement relative to a driving tool.

To achieve the above and other objects, a fastener is provided, including: a driven end including an engaging hole which includes three slots recessed radially and angularly arranged in intervals, each of the three slots being formed as a part of a rectangle and including two right angles, every adjacent two of the three slots defining a rib therebetween.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
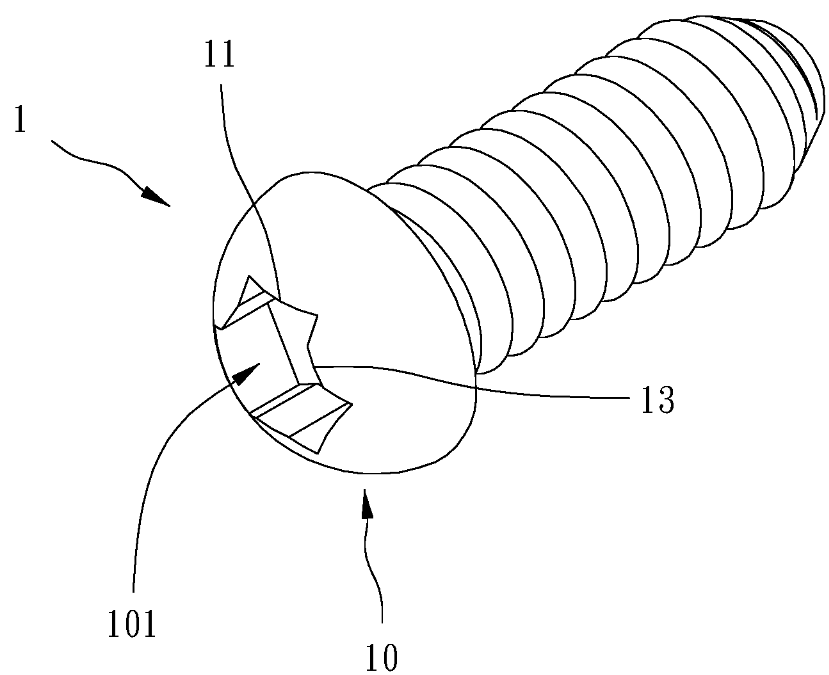
FIG. 1 is a stereogram of a preferable embodiment of the present invention.
Figure 2:
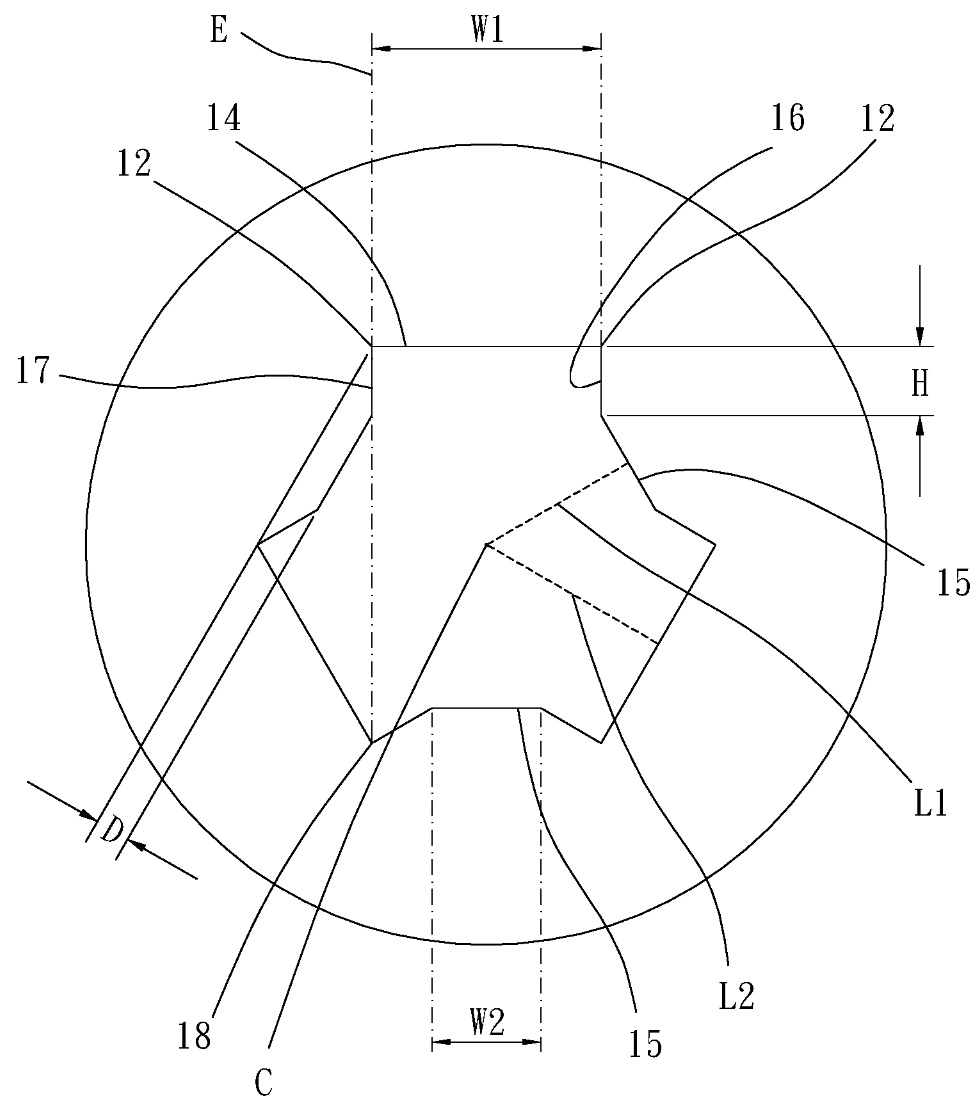
FIG. 2 is a side view of a preferable embodiment of the present invention.
Figure 3:
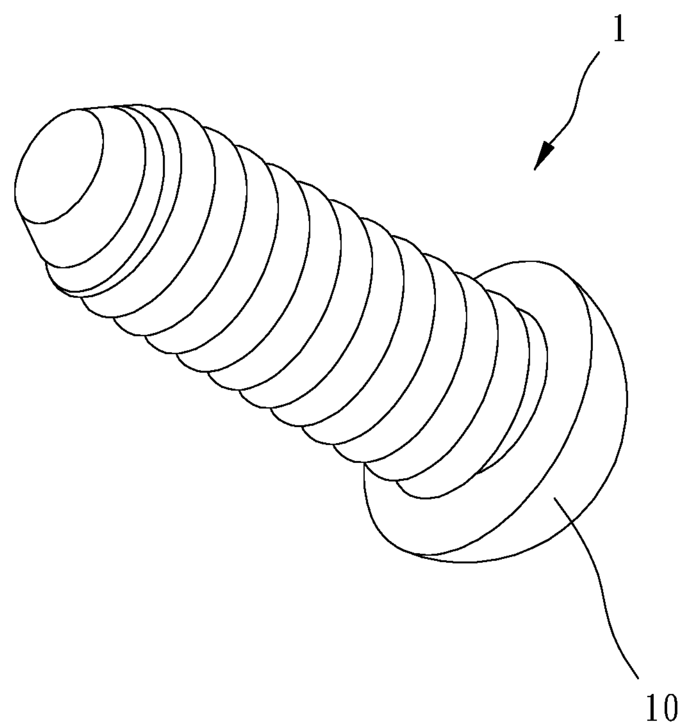
FIG. 3 is another stereogram of a preferable embodiment of the present invention.
Figure 4:
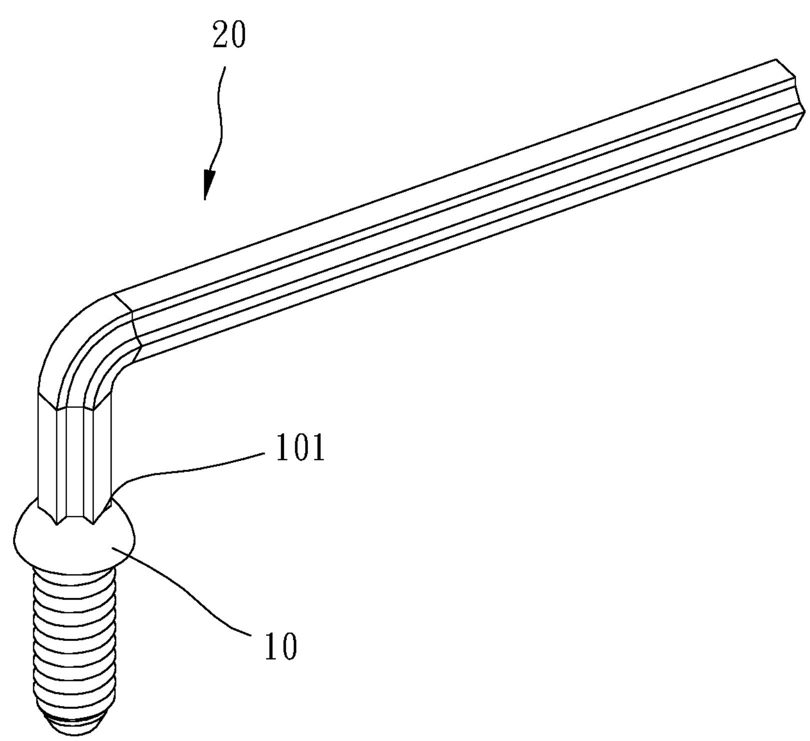
FIG. 4 is a drawing showing application of a preferable embodiment of the present invention.

Please refer to FIGS. 1 to 4 for a preferable embodiment of the present invention. A fastener 1 of the present invention includes a driving end 10, the driving end 10 includes an engaging hole 101 which includes three slots 11 which are angularly arranged in intervals, each of the three slots 11 is formed as a part of a rectangle and including includes two right angles 12, and every adjacent two of the three slots 11 define a rib 13 therebetween. Whereby, the fastener 1 is good in structural strength and torque transmission, and is uneasy to cause slipping disengagement relative to a driving tool. The engaging hole 101 of the driving end 10 can be used to receive an driving portion of a driven member 20 (such as rod-shaped wrench) (FIG. 4), wherein the engaging hole 101 and the driving portion of the driven member 20 mate with each other in shape.

Preferably, the three slots 11 are equiangularly arranged in intervals, thus distributing stress evenly; every adjacent two of the three slots 11 are connected with a plane 15 therebetween, and each said plane 15 is parallel to a radially-facing face 14 of one of the three slots. Preferably, each said radially-facing face 14 has the same width W1, the plane 15 has a width W2 equal to or greater than ½ of a width W1 of the radially-facing face 14, and each said rib 13 is trapezoidal and tapers radially inward so that it can provide large abutment area and even distribution of force. However, the top of the rib may be concave (arced face or transitional face) or convex (arced face or transitional face). Each of the three slots 11 further includes a side face 16 whose height H is equal to a height D of the rib 13 multiplied by [1/sin (30°)], and the height D of each said rib 13 is 0.20 mm to 1.50 mm, thus being good in driving effect and structural strength. The driving end 10 further includes a center C. A first distance L1 from the top of each said each said rib 13 to the center C is 0.20 mm to 1.50 mm smaller than a second distance L2 from a radially-facing face 14 of each of the three slots 11 to the center C. Preferably, the height D of each rib is between ⅕ to ⅓ of the second distance L2, which can provide good driving engagement and good structural strength. An extension E of a side 17 of each said right angle 12 extends through an apex 18 another said right angle 12, which provides good structural strength and efficient transmission of torque.

Figure 5:
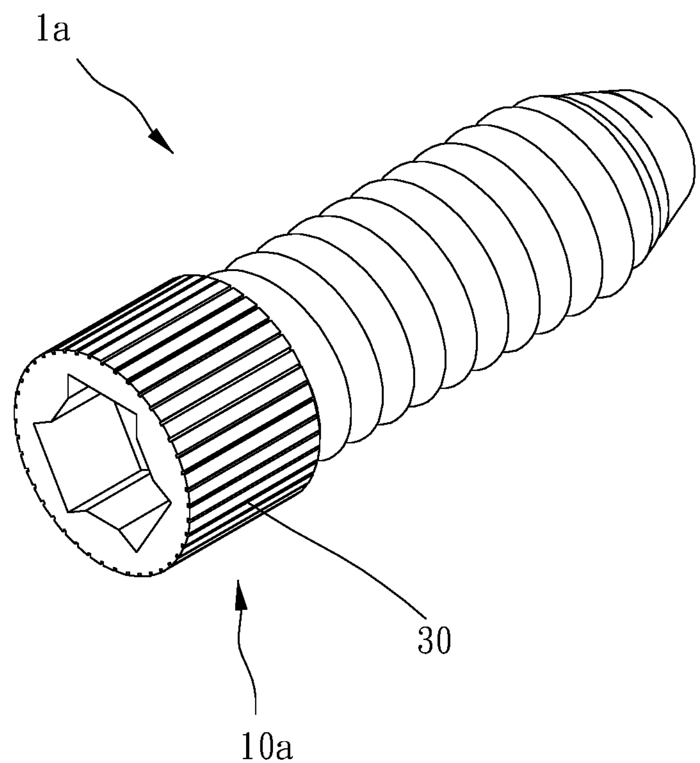
FIG. 5 is a stereogram of another preferable embodiment of the present invention.

In this embodiment, the driving end 10 of the fastener 1 is mushroom-shaped and has the engaging hole 101 recessed thereon. However, as shown in FIG. 5, the driving end 10*a* of the fastener 1*a* may be a cylindrical section or the like, and/or may be provided with an anti-slip structure thereon.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A fastener, including a driving end which includes an engaging hole which includes three slots which are recessed radially and angularly arranged in intervals, each of the three slots being formed as a part of a rectangle and including two right angles, every adjacent two of the three slots defining a rib therebetween;

wherein every adjacent two of the three slots are connected with a plane therebetween, and each said plane is parallel to a radially-facing face of one of the three slots.

2. The fastener of claim 1, wherein the engaging hole further includes a center, and a first distance from a top of each said rib to the center is 0.20 mm to 1.50 mm smaller than a second distance from a radially-facing face of each of the three slots to the center.

3. The fastener of claim 2, wherein the plane has a width equal to or greater than ½ of a width of the radially-facing face; each said radially-facing face has the same width; each said rib is trapezoidal and tapers radially inward; each of the three slots further includes a side face whose height is equal to a height of the rib multiplied by 1/sin(30°); an extension of a side of each said right angle extends through an apex of another said right angle.

4. The fastener of claim 2, wherein the height of each rib is between ⅕ to ⅓ of the second distance.

5. The fastener of claim 1, wherein an extension of a side of each said right angle of one of the three slots extends through an apex of one of the two right angles of another of the three slots.

6. The fastener of claim 1, wherein each said rib is trapezoidal and tapers radially inward.

7. The fastener of claim 1, wherein each said rib has a height of 0.20 mm to 1.50 mm.

8. A fastener, including a driving end which includes an engaging hole which includes three slots which are recessed radially and angularly arranged in intervals, each of the three slots being formed as a part of a rectangle and including two right angles, every adjacent two of the three slots defining a rib therebetween, wherein each of the three slots further includes a side face whose height is a height of the rib multiplied by 1/sin(30°).

9. A fastener, including a driving end which includes an engaging hole which includes three slots which are recessed radially and angularly arranged in intervals, each of the three slots being formed as a part of a rectangle and including two right angles, every adjacent two of the three slots defining a rib therebetween;

wherein the three slots are equiangularly arranged in intervals.

* * * * *